Aug. 25, 1925. 1,551,492
A. KNITTEL
CULTIVATOR
Filed Jan. 15, 1923
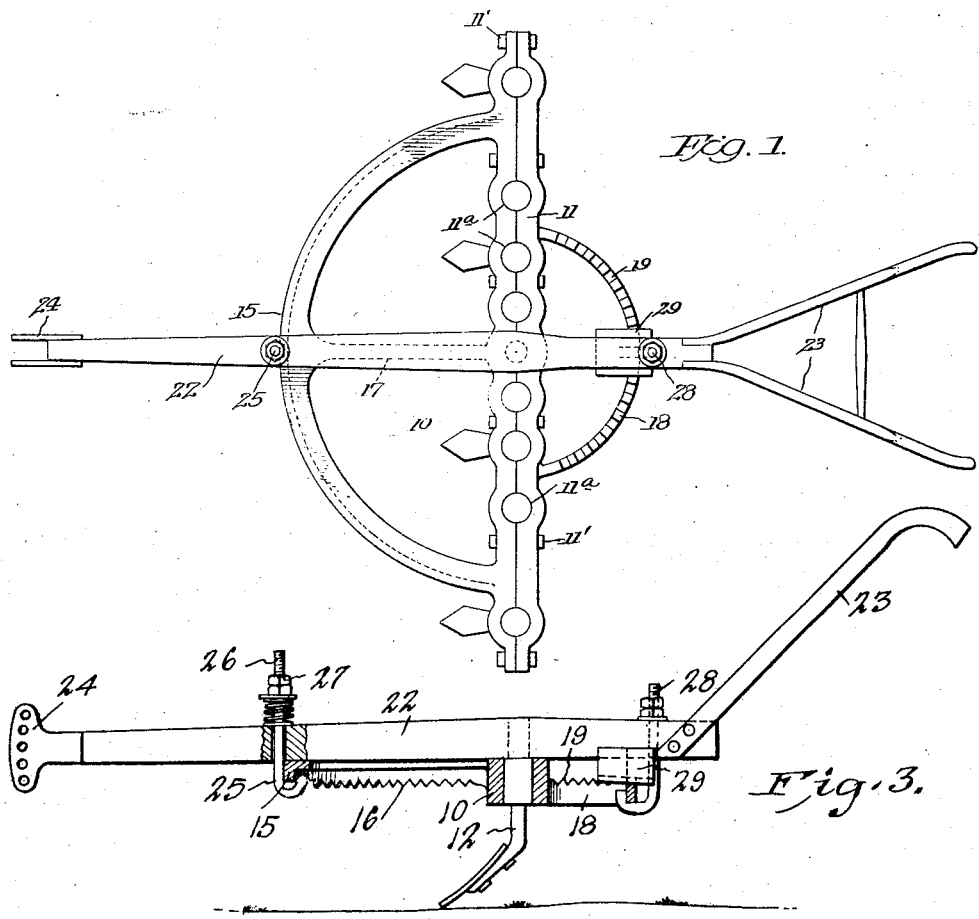
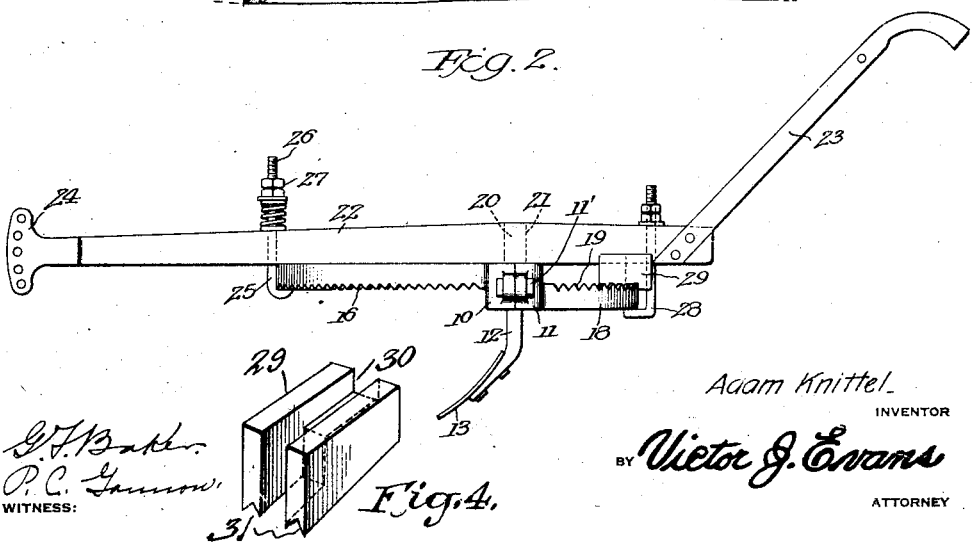
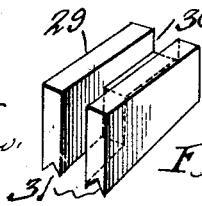
Adam Knittel
INVENTOR
BY *Victor J. Evans*
ATTORNEY Patented Aug. 25, 1925.

1,551,492

UNITED STATES PATENT OFFICE.

ADAM KNITTEL, OF TYNER, TENNESSEE.

CULTIVATOR.

Application filed January 15, 1923. Serial No. 612,825.

*To all whom it may concern:*

Be it known that I, ADAM KNITTEL, a citizen of the United States, residing at Tyner, in the county of Hamilton and State of Tennessee, have invented new and useful Improvements in Cultivators, of which the following is a specification.

This invention relates to improvements in cultivators of the one horse type and has for an object the provision of a cultivator unit, which may be attached to an ordinary plow beam to provide a relatively light, durable and efficient cultivator, which may be manufactured at a low cost.

Another object of the invention is the provision of a cultivator whose width may be regulated and which may be adjusted to cultivate to a considerable depth without placing undue work upon the draft animal.

With the above and other objects in view, the invention further includes the following novel features and details of construction, to be hereinafter more fully described, illustrated in the accompanying drawings and pointed out in the appended claim.

In the drawings:—

Figure 1 is a plan view of a cultivator constructed in accordance with the invention.

Figure 2 is a side elevation of the same.

Figure 3 is a longitudinal sectional view.

Figure 4 is a detail perspective view of the wedge block.

Referring in detail to the drawings, wherein like characters of reference denote corresponding parts, the reference character 10 indicates the cultivator unit which includes a cross beam 11. The beam 11 is of sectional formation whose separate sections are removably secured together by means of bolts or similar fastening devices 11', while each section of the beam is provided with opposed registering semi-circular recesses which provide openings 11ª for the reception of the shanks 12 of blades 13. These shanks are capable of adjustment within the openings 11ª and are held in adjusted position by means of the bolts 11'.

Extending from one section of the beam 11 is a segment 15 which is substantially L-shaped in cross section and which is provided along its lower edge with spaced teeth 16, a brace or web 17 extending from the beam 11 and engaging the segment 15 serving to stiffen and reinforce the latter.

Extending from the opposite section of the beam 11 is a relatively small segment 18, which is provided along its upper edge with spaced teeth 19. The segments 15 and 18 are concentrically arranged and disposed concentrically with respect to these segments and extending upwardly from the beam 11 is a pivot pin 20. This pin enters a socket 21 provided in the bottom of a draft beam 22, which may be of the ordinary plow beam type having handles 23 at one end and a clevis 24 at its opposite end. The cultivator unit 10 may thus be pivotally adjusted with respect to the beam 22, whereby the width of the cultivator may be regulated and for the purpose of holding the cultivator unit in its adjusted position, there is provided a hook 25 which engages the teeth 16 of the segment 15 and which is provided with a threaded shank 26 extending through an opening in the beam 22 and having an adjusting nut 27 mounted thereon. The hook 25 may thus be brought into binding engagement with the teeth 16. In addition, the beam 22 has extending therethrough a hook 28 which engages the lower edge of the segment 18 and like the hook 25 is provided with a threaded shank, upon which is mounted an adjusting nut so as to hold the hook 28 in engagement with the segment 18.

Located between the under face of the beam 22 and the top of the segment 18, is a wedge block 29, whose upper face is provided with a groove 30 for the reception of the lower edge of the beam 22. The opposite face of the block 29 is provided with a plurality (for example three) of rows of teeth 31, which engage the teeth 19 of the segment 18. By bringing these teeth 31 into engagement with the teeth of the segment 18 by moving the block longitudinally of the beam 22, the shanks or standards 12 of the cultivator teeth will be given a greater or less angle of pitch. The depth to which the teeth enter the ground may thus be regulated in accordance with the needs of the soil and the amount of work placed upon a draft animal may thus be regulated.

The invention is susceptible of various changes in its form, proportions and minor details of construction and the right is herein reserved to make such changes as properly fall within the scope of the appended claim.

Having described the invention what is claimed is:—

A cultivator comprising in combination with a draft beam, a cultivator unit including a cross beam, cultivator teeth carried thereby, toothed segments located upon opposite sides of the cross beam, a pivot pin extending concentrically of the segments from the cultivator unit and engaging the draft beam to provide relative pivotal adjustment, means carried by the draft beam and engaging the toothed segments to hold the cultivator unit in adjusted position and means engageable with the draft beam and the teeth of one of the segments to regulate the depth of the cultivator teeth.

In testimony whereof I affix my signature.

ADAM KNITTEL.